United States Patent [19]

Payne

[11] Patent Number: 5,427,505

[45] Date of Patent: Jun. 27, 1995

[54] ENGINE COOLANT EXTRACTOR/INJECTOR WITH DOUBLE SHUT-OFF COUPLING

[76] Inventor: Gerry E. Payne, 1455 Pratt Highway, Birmingham, Ala. 35214

[21] Appl. No.: 208,948

[22] Filed: Mar. 11, 1994

Related U.S. Application Data

[63] Continuation-in-part of Ser. No. 118,390, Sep. 7, 1993, Pat. No. 5,329,982, which is a continuation-in-part of Ser. No. 760,709, Sep. 16, 1991, Pat. No. 5,242,273.

[51] Int. Cl.[6] ............................................. F04F 1/02
[52] U.S. Cl. ..................................... 417/149; 137/205
[58] Field of Search ....................... 137/205, 206, 209; 417/118, 148, 149

[56] References Cited

U.S. PATENT DOCUMENTS

| | | | |
|---|---|---|---|
| 892,254 | 6/1908 | Hanson | 137/205 X |
| 2,740,420 | 4/1956 | Hanks | 137/205 |
| 4,378,026 | 3/1983 | Bauer | 137/205 |
| 4,698,983 | 10/1987 | Hechavarria | 62/292 |
| 4,807,674 | 2/1989 | Sweet | 141/59 |

FOREIGN PATENT DOCUMENTS

| 492078 | 9/1938 | United Kingdom | 417/149 |
|---|---|---|---|

*Primary Examiner*—Allen J. Flanigan

[57] ABSTRACT

An apparatus for extracting and injecting liquid coolant from and into a reservoir for an engine cooling system. The apparatus includes a storage tank for the liquid coolant, and an air pressure system for selectively applying fluid pressure to the tank either above or below atmospheric pressure. A hose connects the tank to the engine cooling system reservoir through a double shut-off-type coupling. One part of the coupling is connected to the reservoir, and the other, to the end of the transfer hose each having its own independent shut-off valve. When the coupling is connected, the valves in both components are opened and conversely when the coupling is disconnected, the valves automatically close.

7 Claims, 4 Drawing Sheets

ENGINE COOLANT EXTRACTOR/INJECTOR WITH DOUBLE SHUT-OFF COUPLING

CROSS REFERENCE TO RELATED APPLICATIONS

This application is a continuation-in-part of U.S. patent application Ser. No. 08/118,390 filed Sep. 7, 1993 now U.S. Pat. No. 5,329,982, which is a continuation-in-part of U.S. patent application Ser. No. 07/760,709 filed Sep. 16, 1991, now U.S. Pat. No. 5,242,273.

BACKGROUND OF THE INVENTION

This invention relates to a system for removing and replacing liquid from and into a reservoir such as a radiator for an internal combustion engine. The liquid is stored in a tank from which it may subsequently be transferred back into the reservoir.

More particularly, the invention relates to an improved system, where the device for coupling a conduit or transfer hose to the reservoir has a double shut-off capability so that the process of connecting or disconnecting the conduit to or from the reservoir does not result in the escape of liquid from either the reservoir or the conduit.

The invention is particularly useful in connection with the method and apparatus shown and described in my U.S. Pat. No. 5,242,273. That system includes a storage tank and a conduit connected at a point near the bottom of the tank. The tank is also connected to an air system with means to either evacuate air from the tank or to pressurize the tank. This may be accomplished by an air pressure system normally found in vehicle service facilities.

The pressure available is used directly to pressurize the interior of the tank. To evacuate air from the tank, however, a venturi device is used and the air pressure system is connected in such a way as to provide high velocity flow through a venturi throat. The pressure drop that occurs in the venturi throat is then tapped and connected through a conduit to evacuate air from the tank.

The other end of the liquid conduit is connectable to the reservoir at a point as low as possible in the reservoir.

To extract the liquid coolant from the reservoir, the tank is first evacuated using the venturi system and then sealed to maintain a vacuum within the tank. Then the conduit is connected in such a way that the liquid is drawn from the reservoir into the tank. The extraction is continued until the liquid is entirely removed or until pressure equilibrium is reached within the tank.

To inject liquid coolant into the reservoir, pressure is applied directly to the tank and the conduit is appropriately connected so that the liquid coolant in the tank is forced into the reservoir.

One difficulty encountered in connection with the system thus described, is that of completing the necessary connections between the storage tank and the liquid coolant reservoir. This process typically involves the opening and closing of valves and the connection of the conduit to the reservoir at a suitable location well below the normal liquid level (normally an awkward location).

One technique is to provide a nipple or other device that is capable of quick connection to a cooperating connector on the liquid conduit. This results in a simpler and more efficient connection, however, during the connection and disconnection process, liquid coolant may escape through one or both of the respective connectors. The loss of liquid coolant in this way can be a serious disadvantage particularly when the purpose is to avoid the environmental pollution resulting from a liquid contaminant entering a floor drain or the like.

The device of the present invention minimizes and may entirely eliminate the difficulty described above and affords other features and advantages heretofore not obtainable.

DESCRIPTION OF THE PREFERRED EMBODIMENT

The system of the invention includes the combination of a liquid coolant extractor/injector of the type described, for use in connection with an engine cooling system. The system generally includes a storage tank and means for selectively applying fluid pressure to the tank either above or below atmospheric pressure. A conduit is connected to the storage tank at a location near the bottom thereof, and has an end that is adapted to be connected to the liquid coolant reservoir for the engine.

In accordance with the invention, the coupling includes one coupling member connected to the reservoir and having a first valve element therein, moveable between an open position and closed position, the valve being biased to the closed position. The second coupling member is associated with an end of the conduit and has a second valve element therein, also movable between an open and closed position and being biased to the closed position. When the respective coupling elements are moved into a connected position, the resulting movement brings about engagement between the two valve elements and ultimately moves them against their respective biasing means to their respective open positions.

On the other hand, when the two coupling members are disconnected from one another, the resulting movement disengages the valve elements from one another and they are moved immediately to their respective closed positions to prevent the escape of liquid coolant therefrom.

BRIEF DESCRIPTION OF THE DRAWINGS

Referring more particularly to the drawings.

DESCRIPTION OF THE PREFERRED EMBODIMENT

Figure 1:
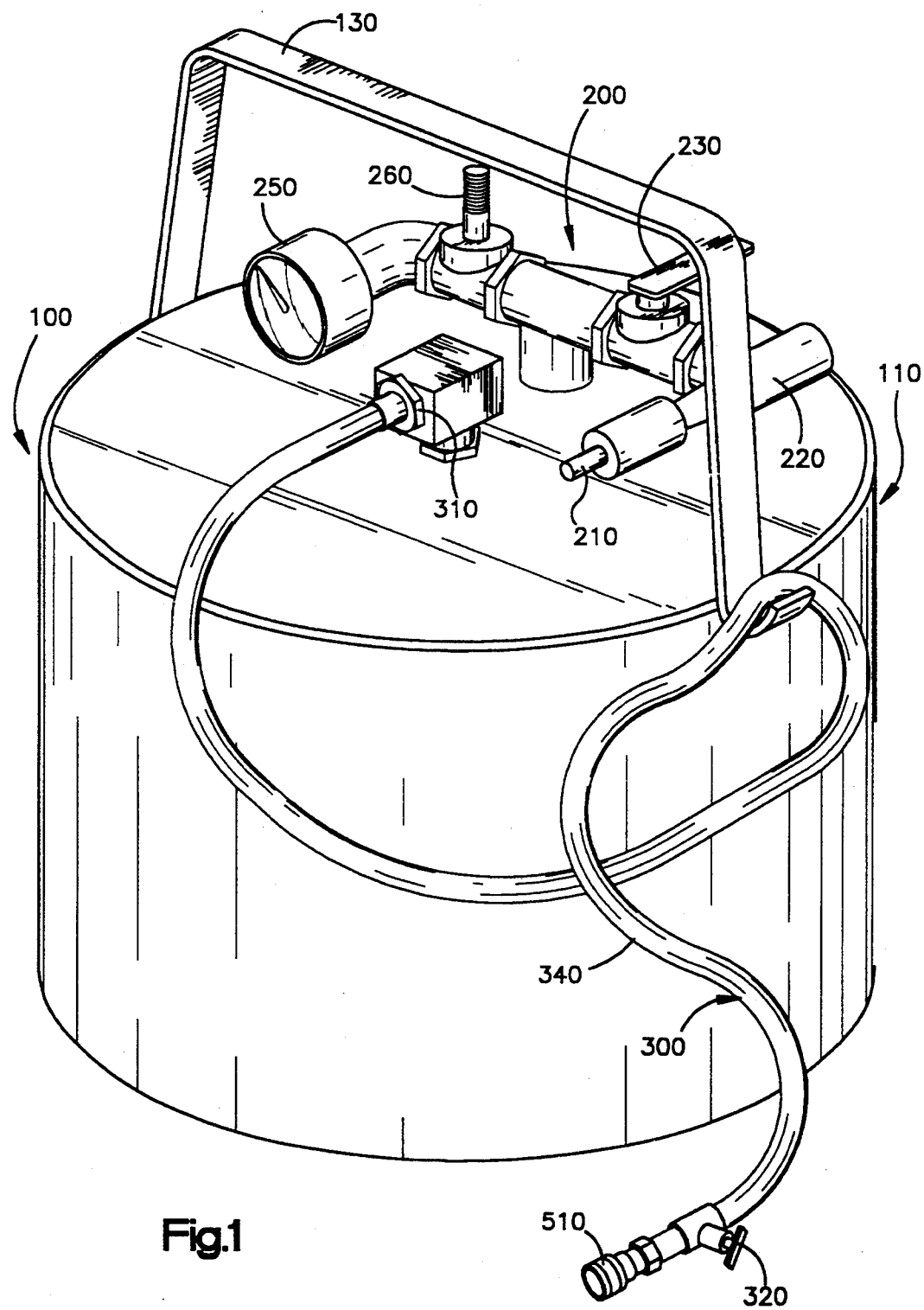
FIG. 1 is a perspective view of a coolant extractor/injector apparatus embodying the invention.
Figure 2:
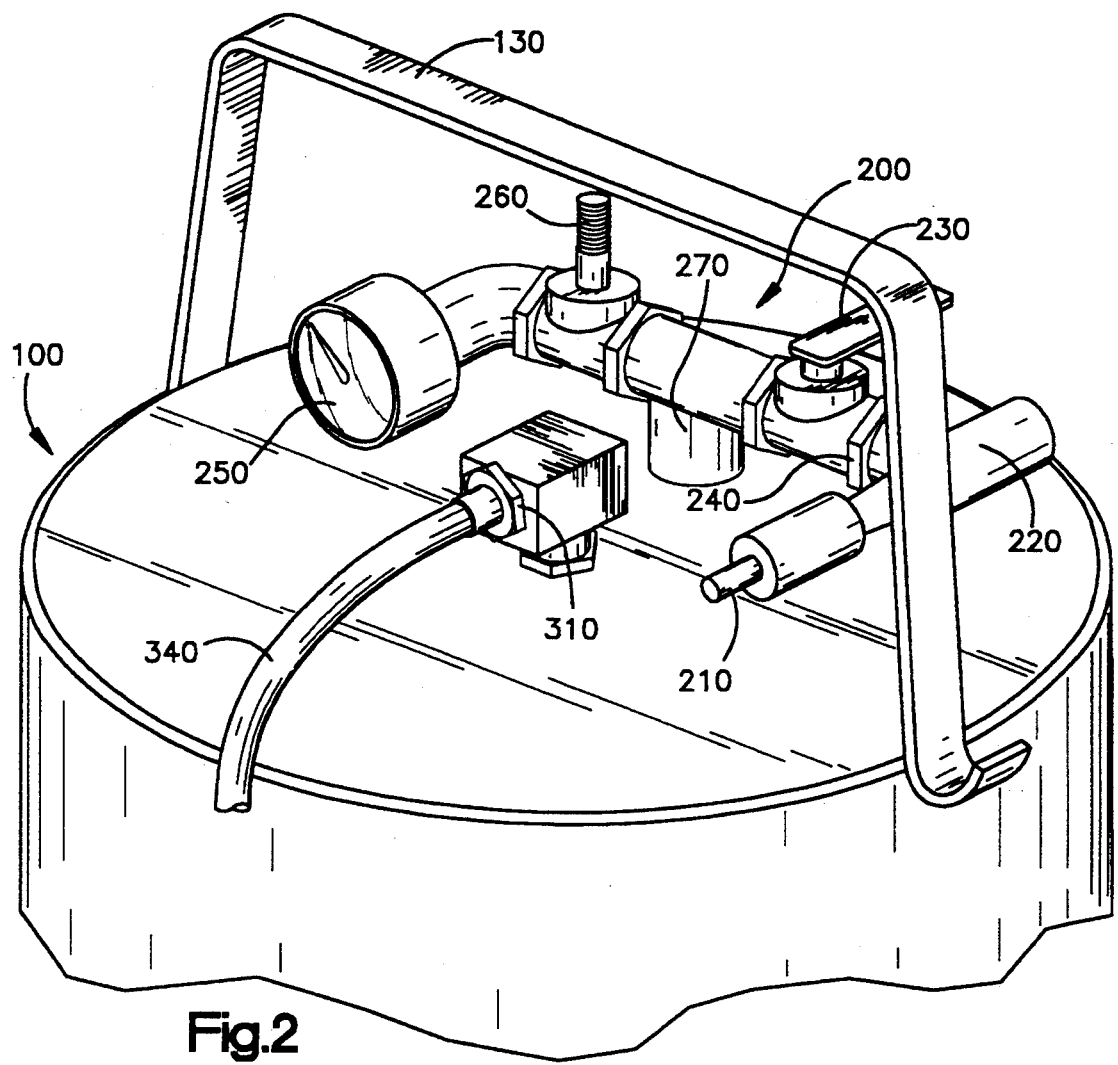
FIG. 2 is a fragmentary perspective view of the apparatus of FIG. 1.
Figure 3:
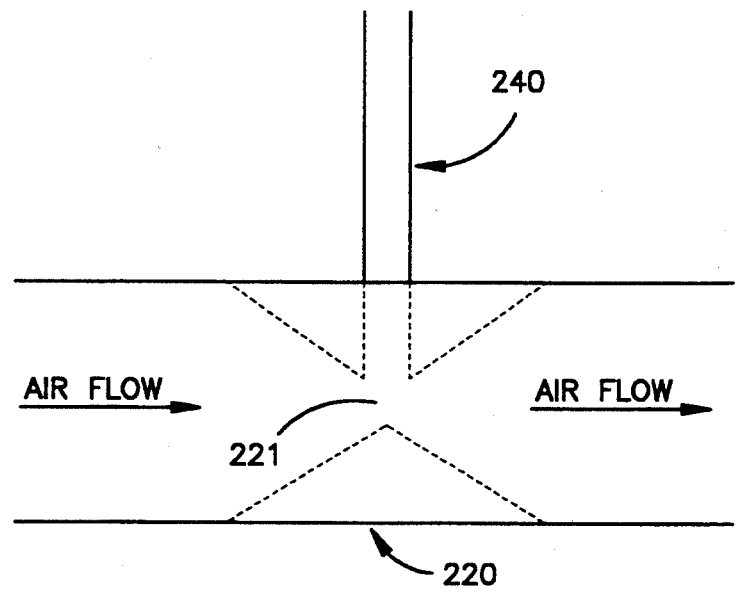
FIG. 3 is a sectional view in somewhat diagramatic form of the venturi device utilized in connection with the apparatus of the invention.
Figure 4:
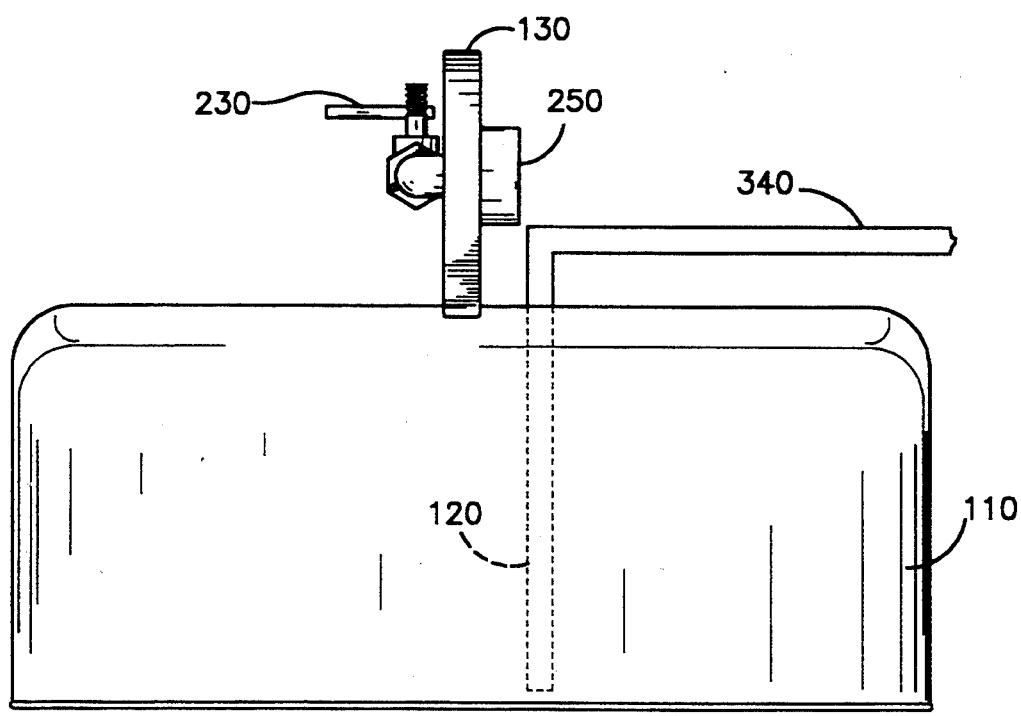
FIG. 4 is a side elevation of the apparatus of FIG.
Figure 5:
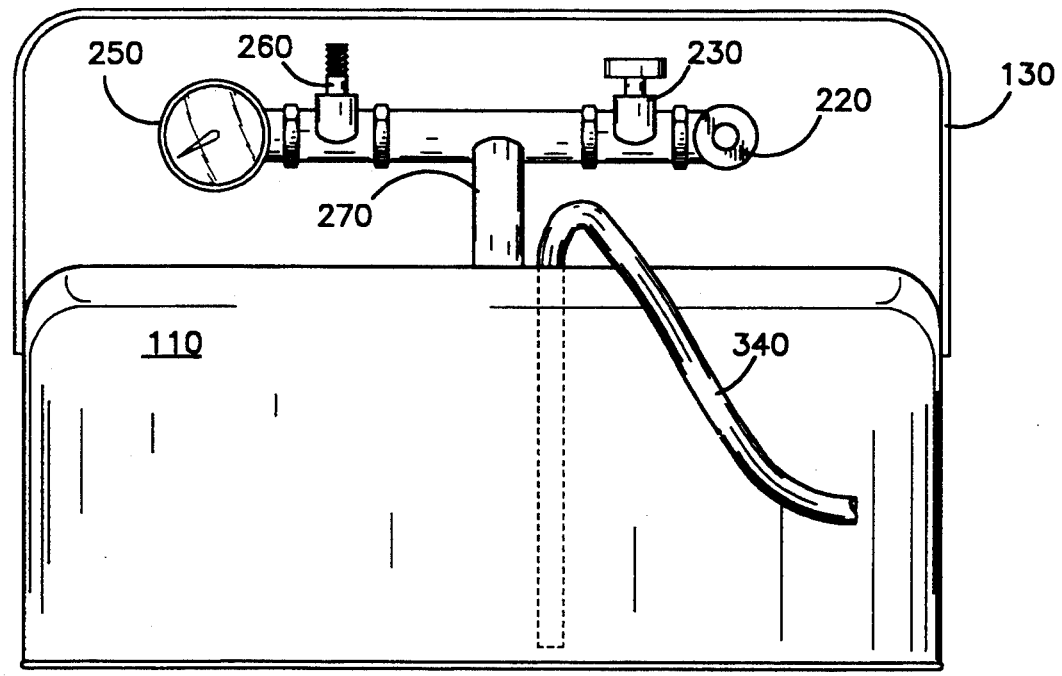
FIG. 5 is another side elevation taken at 90° relative to FIG. 4, of the apparatus of FIG. 1.
Figure 6:
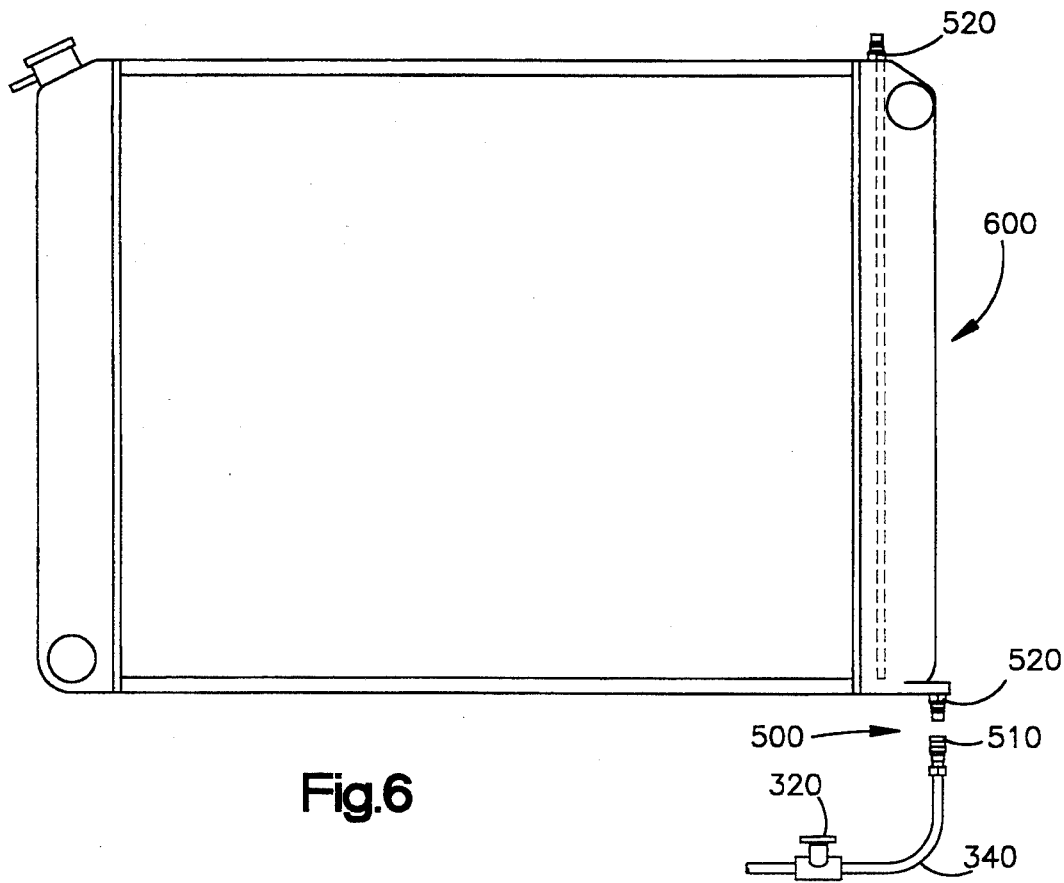
FIG. 6 is an elevational view in somewhat diagramatic form showing a typical radiator having a pair of double shut-off coupling members in accordance with the invention.

Referring initially to FIGS. 1-5, there is shown a system for extracting from and injecting into an engine cooling system, liquid coolant of the type customarily used in such applications. The coolant is normally contained in a reservoir such as a radiator 600 illustrated in FIG. 6. The system includes as its primary components, a tank assembly 100, a pressure control assembly 200, and a hose assembly 300.

The tank assembly 100 includes a tank 110, a dip tube 120 (FIG. 4) and a handle 130. The tank 110 is a closed container, preferably large enough to hold all of the liquid coolant from an engine cooling system. The dip tube 120 is located inside the tank and extends from the top to a level near the bottom.

The pressure control assembly 200 is adapted to control the air pressure in the tank 110 and includes a T-connector 270 mounted on top of the tank and adapted to connect the pressure system to the tank 110. One of the top legs of the T-connector is connected to one end of a venturi rotary valve 230. The other top leg of the T-connector is connected to one of the fittings of a Schraeder valve 260. A vacuum line 240 is connected to a venturi device 220 which connects to a venturi connector 210.

The venturi rotary valve 230 is connected to the other end of the vacuum line 240. The venturi valve 230 controls the flow of air into and out of the tank 110. The Schraeder valve 260 is adapted for connection to an air hose in the conventional manner. An air pressure gage 250 is connected to the other fitting of the Schraeder valve 260 and enables the operator to determine the air pressure level (or vacuum level) within the storage tank 110.

The hose assembly 300 includes a fitting 310 mounted on top of the storage tank 110, a flow control valve 320 and a transfer hose 340. The transfer hose 340 is connected at one end to the fitting 310. The flow control valve 320 is shown at a location intermediate the ends of the transfer hose 340, however, it may be located alternatively adjacent the fitting 310 or at any convenient location in the flow path.

In accordance with the invention, the radiator 600 is provided with one or more double shut-off-type couplings 500. In the embodiment shown in FIG. 6, two couplings 500 are provided one near the bottom of the radiator and one near the top. This provides two convenient locations for connecting the extraction/injection system to the radiator, depending upon the particular circumstances.

The coupling 500 (FIG. 7) comprises a female coupling member 510 and a male coupling member 520. Each of the coupling members 510 and 520 has a threaded fitting 511, 521 at one end to permit connection to their respective components. The fitting 521 connects to a matching outlet fitting on the radiator 600 and the fitting 511 connects to the end of the transfer hose 340.

The female coupling member 510 includes a conical valve element 512 adapted to move in an axial direction into and out of engagement with a valve seat 513 formed integrally with the valve body. The valve element 512 is movable axially between a closed position shown in FIG. 7 and an open position, wherein the valve element is moved away from engagement with the valve seat 513 against the biasing force of a resilient spring 514 that serves to bias the valve element toward its closed position. The forward end of the conical valve 512 element has an operating head 515 that faces outwardly toward the male coupling member 520.

Figure 7:
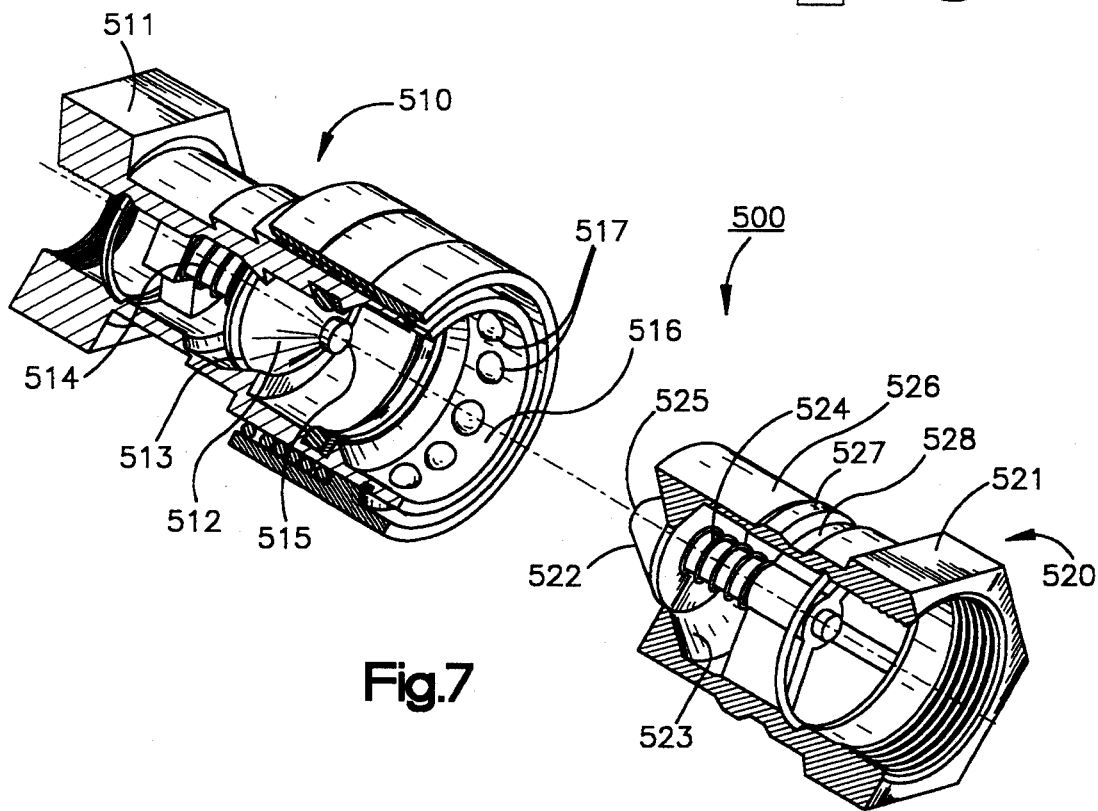
FIG. 7 is a perspective view of a typical double shut-off coupling (in disconnected condition) for use in connection with the apparatus of the invention.

The male coupling member 520 also includes a conical valve element 522 moveable in an axial direction between an open position and a closed position shown in FIG. 7. In its closed position, the outer surface portions of the conical valve surface engage a valve seat 523 formed in the body of the coupling member 520. The valve element 522 is biased toward its closed position by means of a resilient helical spring 524. The apex end of the conical valve elements 512 has an operating head 525 similar to the operating head 515.

The outer end of the female coupling element 510, forms a cylindrical recess 516 with a series of locking balls 517 spaced symmetrically about the circumference. The male coupling member 520 has an external cylindrical surface 526 formed at its forward end adapted to be received in the recess 516. The cylindrical surface 526 has an annular ridge portion 527 formed thereon and an annular locking groove 528. When the male coupling member is moved into the recess 516, axial movement forces the locking balls 517 radially outward until the annular ridge 527 moves axially inward of the balls 517, whereupon the balls move radially inward into the annular groove 528 to lock the coupling members together.

During the connection process, the two operating heads 515 and 525 come into engagement and, in fact, force each other in an axial direction out of their respective closed position to an open position.

Conversely, when the male coupling member 520 is disconnected by pulling it in an axial direction away from the female coupling member 510, the axial movement causes the operating heads 515 and 525 of the respective valve elements to disengage so that the elements 512 and 522 move immediately in response to the biasing force of the respective springs in an axial direction to their closed positions. The result is a double shut-off-type coupling, which when disconnected, prevents the escape of liquid from either coupling member.

A typical double shut-off coupling that may be used is available from the Quick Coupling Division of Parker Corporation, of 3145 Lewis Road, Minneapolis, Minn.

In the operation of the apparatus which will be described first with respective to the extraction of coolant from the radiator 600, a vacuum is first established in the storage tank 110. This is done by connecting a compressed air supply hose to the venturi connector 210. At this point, the tank is sealed and the flow control valve 320 is closed.

Air from the supply hose is forced through the venturi chamber 220, thus causing a reduced pressure in the venturi throat 221. This creates a vacuum in the vacuum line 240 and results in the evacuation of air from the tank 110. The air pressure gage 250 measures the amount of vacuum in the tank during the evacuation process. When the air pressure reaches a desired vacuum level, the venturi rotary valve 230 is closed. At this point, the transfer hose 340 is connected to the radiator 600 using the double shut-off coupling 500 and the flow control valve 320 is opened. Once the coupling members 510 and 520 are connected, both valves 512 and 522 open to complete the passage through the coupling into the radiator.

In response to the vacuum condition in the tank, coolant flows from the radiator 600 through the transfer hose 340 and flow control valve 320 into the tank 110. When the air pressure inside the tank is equal to the ambient pressure or pressure in the cooling system, or when the coolant is substantially removed from the reservoir or the flow control valve 320 is closed, fluid flow will cease. At this point, the coupling 510 may be disconnected, whereupon the valve elements will close to prevent the escape of liquid coolant from either component of the coupling.

To inject coolant from the tank into the radiator 600, the air hose is connected to the Schraeder valve 260. The resulting pressure through the Schraeder valve pressurizes the tank until it reaches a desired positive pressure as indicated by the air pressure gage 250. At this point, the coupling 510 is connected to lock the members to one another, and at the same time, to cause the opening of both the valve elements 512 and 522. Then the flow control valve 320 is opened. This places the transfer hose 340 in communication with the reservoir or engine radiator 600 so that the liquid coolant will be forced by the pressure in the tank 110 through the transfer hose and into the radiator. The flow continues until all of the liquid coolant is transferred to the reservoir, or until the pressure inside the tank equals the atmospheric pressure, or until the flow control valve 320 is closed.

It will be seen that the resulting improvement greatly simplifies the liquid coolant extraction/injection process by minimizing the number of valves, connectors, etc. that must be connected, and at the same time preventing the escape of liquid coolant from either the radiator or the transfer hose.

While the invention has been shown and described with respect to a specific embodiment thereof, this is intended for the purpose of illustration rather than limitation and other variations and modifications of the specific device herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. An apparatus for extracting and injecting liquid coolant from and into a reservoir for an engine cooling system comprising a tank, means for selectively applying fluid pressure within said tank either above or below atmospheric pressure, conduit means adapted to extend between said tank and said reservoir, coupling means for connecting said conduit means to said reservoir, said coupling means including, a normally closed, double shut-off valve means for shutting off said reservoir and said conduit means at said coupling means when said coupling means is disconnected, said valve means being adapted to open when said coupling means is connected.

2. An apparatus as defined in claim 1, wherein said coupling means comprises:

a first coupling member connected to said reservoir and having a first valve means therein movable between an open position and a closed position, and first resilient means biasing said valve means to said closed position and;

a second coupling member connected to said conduit means and having a second valve means therein movable between an open position and a closed position and second resilient means biasing said valve means to said closed position, said first and second valve elements being engaged by the relative axial movement when said coupling members are interconnected to cause movement thereof to their respective open positions and disengaged from one another when said coupling members are disconnected to cause movement thereof to their respective closed positions.

3. Apparatus as defined in claim 1, wherein said means for applying pressure to said tank below atmospheric pressure comprises a venturi device.

4. Apparatus as defined in claim 1, wherein said conduit means comprises a flexible hose.

5. Apparatus as defined in claim 2, wherein said reservoir comprises a vehicle engine radiator.

6. Apparatus as defined in claim 5, wherein said first coupling member is connected at a location adjacent the bottom of said radiator.

7. Apparatus as defined in claim 5, wherein said radiator has a generally vertical conduit located therein and extending generally from the top to the bottom thereof and wherein said first coupling member is connected to the top of said radiator in operative relation to said vertical conduit.

* * * * *